(No Model.)
F. SINGLETON.
FASTENING DEVICE FOR SPINDLES.
No. 495,712. Patented Apr. 18, 1893.
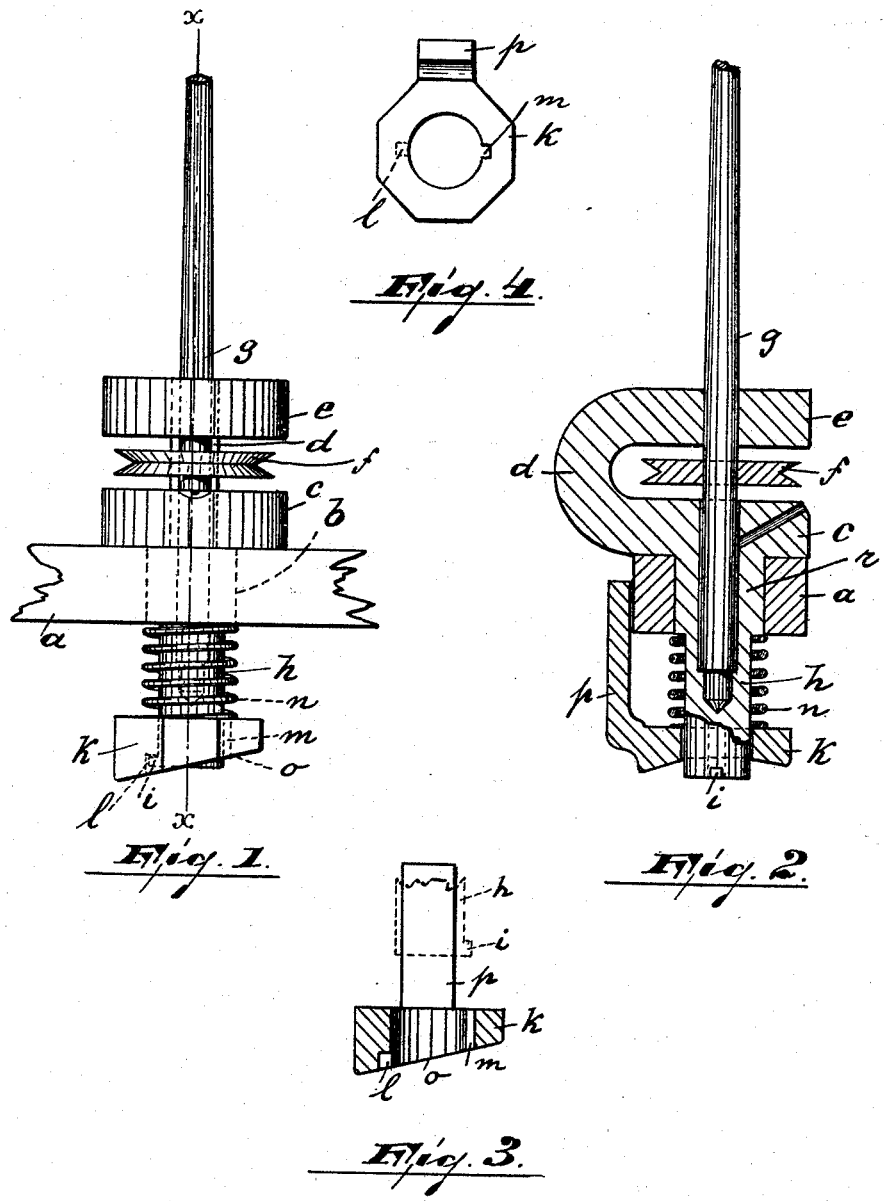
WITNESSES:
Wm. D. Bell.
Walter Thompson.
INVENTOR:
Frank Singleton
BY Gartner & Co
ATTORNEYS.

UNITED STATES PATENT OFFICE.

FRANK SINGLETON, OF DOVER, NEW JERSEY.

FASTENING DEVICE FOR SPINDLES.

SPECIFICATION forming part of Letters Patent No. 495,712, dated April 18, 1893.

Application filed August 11, 1892. Serial No. 442,783. (No model.)

*To all whom it may concern:*

Be it known that I, FRANK SINGLETON, a citizen of the United States, residing at Dover, county of Morris, and State of New Jersey, have invented certain new and useful Improvements in Fastening Devices for Spindles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a spindle fastening device, simple and durable in construction, and easily operated.

The invention consists in the improved spindle fastening device, and the combination and arrangements of the various parts thereof, substantially as will be hereinafter more fully described and finally embodied in the clauses of the claim.

Referring to the accompanying drawings, in which like letters of reference indicate corresponding parts in each of the several figures: Figure 1. is an elevation of a spindle, attached to a portion of a rail, and embodying my improvement. Fig. 2. is a sectional view on line $x$, Fig. 1. Figs. 3 and 4 are detail views of the fastening or locking mechanism.

In said drawings $a$ represents the rail, provided with a circular opening $b$. In said opening is arranged the rounded downwardly extending projection $r$ of bracket $c, d, e$, which latter is preferably made U shaped, as clearly shown in Fig. 2. of the drawings. The reduced portion $h$ of projection $r$ is provided with a lug $i$, adapted to engage the recess $l$ of nut $k$. Said nut is also provided with a passage or groove $m$, and with an upwardly extending arm $p$, the latter resting, with its free end, against the rear side of the rail $a$ for the purpose of preventing the spindle-holder or bracket $c, d, e$ from turning around, while the spindle is in motion. The lower portion of said nut is so arranged, as to form an inclined surface, as shown at $o$, Figs. 1, and 3. The spindle $g$ is securely fastened in the bracket and into its downwardly extending projection, and is provided with the grooved driving wheel $f$, as in the usual manner. Between the rail and the nut, and surrounding the reduced portion $h$, is arranged a spiral spring $n$.

In operation, the spindle bracket is placed with its projection on and through the rail, so that its lug $i$ is opposite the groove or passage $m$, of the nut $k$. Said nut is then held, with its extending arm resting against the back of the rail, and the bracket with its projection, is moved downward, until the lug $i$ has freed its respective groove $m$. The bracket is then turned for about one hundred and eighty degrees, when the lug, which during this motion slides on the inclined surface $o$ of the nut, drops into its respective recess $l$ (by action of the spiral spring $n$). For detaching the bracket and its spindle from the rail, the reverse manipulation is necessary, as will be manifest.

I do not intend to limit myself to the exact construction, shown and described as various alterations can be made, without changing the scope of my invention.

Having thus described my invention, what I claim as new, and desire to secure by Letters Patent, is—

1. A spindle fastening device consisting of a spindle carrying bracket, provided at its downwardly extending portion with a lug, a spindle arranged in said bracket, a nut provided with a groove, a recess and an inclined lower surface and also provided with an upwardly extending arm, and a spiral spring surrounding the downwardly extending portion of the bracket, all said parts being arranged and combined to operate, substantially as described and for the purposes set forth.

2. In a spindle fastening device, the combination with the rail and the spindle, of a bracket supporting said spindle, said bracket being provided with a downwardly extending projection, adapted to pass through said rail, and being also provided at said downwardly extending projection with a lug, a nut, provided with a recess and adapted to engage said projection and its lug, and a spiral spring adapted to control said nut, all said parts being arranged and combined to operate, substantially as described and for the purposes set forth.

In testimony that I claim the foregoing I have hereunto set my hand this 26th day of July, 1892.

FRANK SINGLETON.

Witnesses:
JAMES J. VAN HOVENBERG,
M. MUNSON SEARING.